(12) United States Patent
Okumura et al.

(10) Patent No.: US 7,636,278 B2
(45) Date of Patent: Dec. 22, 2009

(54) INFORMATION RECORDING SYSTEM AND AN INFORMATION RECORDING METHOD

(75) Inventors: Tomoaki Okumura, Osaka (JP); Tsuyoshi Hiraki, Osaka (JP); Kouichi Komawaki, Kyoto (JP); Kiyotaka Tanaka, Osaka (JP); Kazumasa Tarutani, Osaka (JP)

(73) Assignee: Panasonic Corporation, Osaka (JP)

( * ) Notice: Subject to any disclaimer, the term of this patent is extended or adjusted under 35 U.S.C. 154(b) by 59 days.

(21) Appl. No.: 12/123,933

(22) Filed: May 20, 2008

(65) Prior Publication Data

US 2009/0003148 A1 Jan. 1, 2009

(30) Foreign Application Priority Data

Jun. 29, 2007 (JP) ............................. 2007-172645

(51) Int. Cl.
*G11B 7/00* (2006.01)
(52) U.S. Cl. ............... 369/44.13; 369/44.25; 369/53.34
(58) Field of Classification Search ... 369/275.1–275.5, 369/53.24, 59.25, 47.54, 47.47, 47.36, 59.11, 369/47.1, 47.19, 116, 59.1, 44.28, 47.22, 369/47.27, 44.13, 47.17
See application file for complete search history.

(56) References Cited

U.S. PATENT DOCUMENTS

| | | | |
|---|---|---|---|
| 6,188,655 B1 * | 2/2001 | Yoshida et al. ............ | 369/47.17 |
| 7,054,250 B2 | 5/2006 | Hsu et al. | |
| 7,362,664 B2 * | 4/2008 | Ishibashi et al. ......... | 369/30.01 |

FOREIGN PATENT DOCUMENTS

| | | |
|---|---|---|
| JP | 10-241260 | 9/1998 |
| JP | 3635514 | 4/2004 |

* cited by examiner

*Primary Examiner*—Ali Neyzari
(74) *Attorney, Agent, or Firm*—McDermott Will & Emery LLP

(57) ABSTRACT

An information recording system for recording information on an optical disc using a reference clock signal generated based on a push-pull signal including a wobble frequency component, the system includes an amplitude obtaining unit for obtaining an amplitude value of the push-pull signal, a threshold calculation unit for calculating a displacement threshold of the push-pull signal based on the amplitude value obtained by the amplitude obtaining unit, and a noise reduction unit for generating a corrected push-pull signal by correcting the push-pull signal such that a displacement exceeding the displacement threshold is reduced. The reference clock signal is generated based on the corrected push-pull signal generated by the noise reduction unit.

11 Claims, 8 Drawing Sheets

INFORMATION RECORDING SYSTEM AND AN INFORMATION RECORDING METHOD

CROSS-REFERENCE TO RELATED APPLICATIONS

This application claims priority under 35 U.S.C. §119(a) on Japanese Patent Application No 2007-172645 filed on Jun. 29, 2007, the entire contents of which are hereby incorporated by reference.

BACKGROUND OF THE INVENTION

1. Field of the Invention

The present invention relates to an information recording system and information recording method for recording information on an optical disc, and particularly to the technique of precisely generating a reference clock signal for use in, for example, precisely determining a recording position when recording information on a wobbled optical disc such as a DVD-R.

2. Description of the Prior Art

When recording data on a DVD-R, information recording systems detect a push-pull signal including a wobble frequency component of an information track by applying a light beam to the information track. Part of the light beam happens to be applied to pre-pits on tracks adjacent to the information track, which causes signals corresponding to the pre-pits to be incorporated with the push-pull signal detected from the information track, resulting in a problem of not being able to detect a quality push-pull signal.

The signals corresponding to the pre-pits have impulse characteristics, i.e. characteristics to have a signal uniformly distributed over the entire frequency band, and thus, they cause another problem of not being able to remove the signals corresponding to the pre-pits only by a simple filter.

Japanese Laid-Open Patent Publication No. 10-241260 discloses an information recording system free from such problems.

The information recording system disclosed in the publication includes a wobble signal extracting unit 22. The wobble signal extracting unit 22 includes, as shown in FIG. 1 in the publication, a limit-level generator 25, a limiter 26, a BPF 27, and a binarizer 28.

The limit-level generator 25 generates upper limit signal $S_{UL}$ and lower limit signal $S_{WL}$, which may be modulated according to pre-information signal $S_{PP}$ and limit the level of $S_{PP}$, based on pre-information signal $S_{PP}$, i.e. a push-pull signal, outputted by a pickup. The width between upper limit signal $S_{UL}$ and lower limit signal $S_{WL}$ is set to a predetermined level width.

The limiter 26 uses the limit signals generated by the limit-level generator 25 to suppress a noise signal derived from pre-pits in pre-information signal $S_{PP}$ and outputs limited pre-information signal $S_{PL}$.

The BPF 27 removes a high frequency component from the limited pre-information signal $S_{PL}$ to output wobble signal $S_B$.

The binarizer 28 binarizes wobble signal $S_B$ to output extracted signal $S_{DTT}$.

SUMMARY OF THE INVENTION

The limit-level generator 25 in the information recording system of Japanese Laid-Open Patent Publication No. 10-241260, has a predetermined width between upper limit signal $S_{UL}$ and lower limit signal $S_{WL}$. When the amplitude of $S_{PP}$ is smaller, the limit signal accordingly has an increased proportion of width to amplitude, resulting in insufficient suppression of noise signals derived from various factors such as pre-pits. Limited pre-information signal $S_{PL}$ is thus outputted with poor precision.

Since information recording systems record information using a reference clock generated based on limited pre-information signal $S_{PL}$, deterioration in the precision of the limited pre-information signal $S_{PL}$ causes deterioration in, for example, recording quality.

Considering such circumstances, it is an object of the present invention to record information precisely on an optical disc even when a push-pull signal includes a noise signal.

To solve the problem, according to the present invention, an information recording system or an information recording method for recording information on an optical disc using a reference clock signal generated based on a push-pull signal including a wobble frequency component obtains an amplitude value of the push-pull signal, calculates a displacement threshold based on the obtained amplitude value, generates a corrected push-pull signal by correcting the push-pull signal such that a displacement exceeding the displacement threshold is reduced, and the reference clock signal is generated based on the generated corrected push-pull signal.

Since the push-pull signal is thus corrected using the displacement threshold which depends on the amplitude of the push-pull signal, noise signals are sufficiently suppressed to obtain a precise corrected push-pull signal even when the amplitude of the push-pull signal is small. Consequently, a reference clock signal is generated based on the precise corrected push-pull signal, and information is precisely recorded on an optical disc using the reference clock signal.

DETAILED DESCRIPTION OF THE PREFERRED EMBODIMENTS

Figure 1:
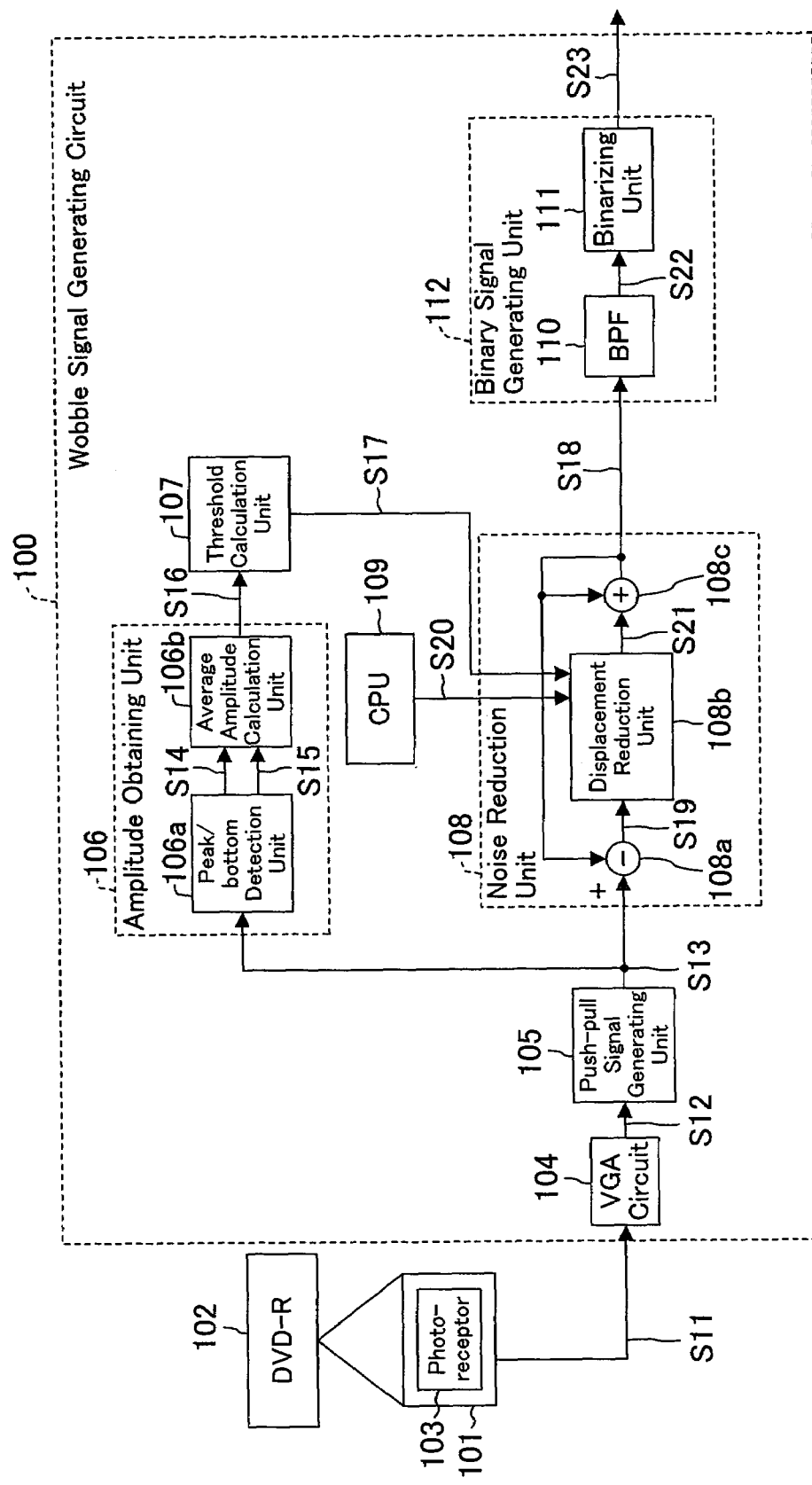
FIG. 1 is a block diagram illustrating a structure of a wobble signal generating circuit 100 of the first embodiment.

Hereinafter, embodiments of the present invention are illustrated with reference to the drawings. Elements for any of the embodiments functioning equally as those of another embodiment are denoted by identical reference numerals to omit repetitive description.

First Embodiment

An information recording and reproducing system (an information recording system) according to the first embodiment of the present invention includes, as shown in FIG. 1, a wobble signal generating circuit 100 and an optical pickup 101, and records information on a DVD-R 102, which is a WO (Write Once) information recording medium accepting addition of writing but not accepting overwriting. The DVD-R 102 is formed with a recording surface having a spiral or concentric-circle recording area which is meandering, and the meandering is known as wobble.

The information recording and reproducing system of each embodiment herein detects a wobble frequency of an information track, e.g., a groove track, wobbled in the DVD-R 102 to generate (extract) a reference clock, based on the wobble frequency, for controlling the DVD-R 102 in rotation and recording. Information is recorded on the DVD-R 102 by controlling the DVD-R 102 in rotation and recording using the generated reference clock. Upon recording, a pre-pit corresponding to address information is formed in a track between two information tracks, for example a land track.

The optical pickup 101 includes a photoreceptor 103 inside.

The photoreceptor 103 receives a reflection of a light beam applied to the DVD-R 102 in a photoelectric area divided into four sections, and converts the current generated in each section to a voltage (I-V conversion). The photoreceptor 103 then outputs an inner voltage and an outer voltage as reproduction signal S11 by adding respective voltages.

The wobble signal generating circuit 100 includes, as shown in FIG. 1, a VGA (Variable Gain Amplifier) circuit 104, a push-pull signal generating unit 105, an amplitude obtaining unit 106, a threshold calculation unit 107, a noise reduction unit 108, a CPU (Central Processing Unit) 109, a band-pass filter (BPF) 110, and a binarizing unit 111.

The VGA circuit 104 amplifies reproduction signal S11 outputted by the photoreceptor 103 to output it as amplified signal S12. Specifically, the VGA circuit 104 amplifies the difference between the inner and outer voltages to output the amplified difference as amplified signal S12. This amplification controls the amplitude of amplified signal S12.

The push-pull signal generating unit 105 outputs amplified signal S12 outputted by the VGA circuit 104 as push-pull signal S13 indicating the difference between the outer and inner voltages. Push-pull signal S13 includes a wobble frequency component.

The amplitude obtaining unit 106 includes a peak/bottom detection unit 106a and an average amplitude calculation unit 106b.

The peak/bottom detection unit 106a detects a peak value, i.e. a peak voltage, and a bottom value, i.e. a bottom voltage, of push-pull signal S13 in each predetermined period which is not less than one wobble cycle. The one wobble cycle is defined as a time interval equivalent to the inverse of the wobble frequency. The detection unit 106a then outputs the detected peak value as peak signal S14 and the detected bottom value as bottom signal S15. The predetermined period may be any time length as long as it is not less than one wobble cycle, and also may be defined as one or more predetermined wobble cycle(s).

The average amplitude calculation unit 106b receives peak signal S14 and bottom signal S15 from the peak/bottom detection unit 106a every passage of the predetermined period to calculate the amplitude by subtracting bottom signal S15 from peak signal S14. Specifically, the peak/bottom detection unit 106a detects the peak and bottom values for each of the plurality of predetermined periods, and subsequently the average amplitude calculation unit 106b calculates the amplitude for each period and then calculates the average of the calculated amplitudes to output the average amplitude as average amplitude signal S16.

It should be noted that the method for obtaining the amplitude of push-pull signal S13 by the amplitude obtaining unit 106 is not limited to the method above, and the amplitude may be obtained by, for example, subtracting a bottom value from a peak value in one wobble cycle.

The threshold calculation unit 107 receives average amplitude signal S16 and multiplies average amplitude signal S16 by a predetermined gain such that the amplitude (voltage) is reduced to output the product as threshold signal S17. The displacement threshold indicating the voltage level of threshold signal S17 is thus a product of the amplitude value of average amplitude signal S16 and a predetermined gain value. For example, in a case that the amplitude value of average amplitude signal S16 is 80 and the gain value of 1/10 is given for reducing the amplitude value, the value 8 obtained by multiplying 80 by 1/10 is to be the displacement threshold. The threshold calculation unit 107 outputs threshold signal S17 at a constant level before the amplitude is obtained by the amplitude obtaining unit 106. That is, the displacement threshold is constant before the amplitude is obtained by the amplitude obtaining unit 106.

The noise reduction unit 108 corrects push-pull signal S13 outputted by the push-pull signal generating unit 105 such that an abrupt displacement exceeding the displacement threshold is reduced (moderated) to generate corrected push-pull signal S18. The noise reduction unit 108 specifically includes a displacement output unit 108a, a displacement reduction unit 108b, and an adder 108c.

The displacement output unit 108a outputs the difference between push-pull signal S13 of the current sampling cycle and corrected push-pull signal S18 of the immediately preceding sampling cycle as displacement signal S19.

When the absolute value of displacement signal S19 outputted by the displacement output unit 108a is larger than threshold signal S17 outputted by the threshold calculation unit 107, the displacement reduction unit 108b reduces displacement signal S19 based on a displacement reduction gain value given by the CPU 109 to output reduced displacement signal S21. In an example of the displacement reduction gain value being 1/4, the displacement reduction unit 108b outputs a signal reduced to 1/4 of the level of displacement signal S19 as reduced displacement signal S21. In contrast, when the absolute value of displacement signal S19 outputted by the displacement output unit 108a is smaller than threshold signal S17 outputted by the threshold calculation unit 107, the displacement reduction unit 108b outputs displacement signal S19 as reduced displacement signal S21 without processing. In this specification, the displacement reduction gain value is defined as a value indicated by displacement reduction gain value signal S20 outputted by the CPU 109.

The adder 108c adds reduced displacement signal S21 to corrected push-pull signal S18 of the immediately preceding sampling cycle to output as new corrected push-pull signal S18.

The BPF 110 extracts a wobble frequency component from corrected push-pull signal S18 generated by the noise reduction unit 108 in reference to the wobble frequency as the center frequency to output the extract as band-pass filter output signal S22.

The binarizing unit 111 binarizes band-pass filter output signal S22 to generate wobble binary signal S23.

The BPF 110 and the binarizing unit 111 compose a binary signal generating unit 112.

The following descriptions describe how the wobble signal generating circuit 100 operates.

In response to reproduction signal S11 input from the photoreceptor 103 of the optical pickup 101 to the wobble signal generating circuit 100, the VGA circuit 104 amplifies reproduction signal S11 to output amplified signal S12. The push-pull signal generating unit 105 then outputs amplified signal S12 outputted by the VGA circuit 104 as push-pull signal S13. The noise reduction unit 108 then reduces an abrupt displacement of outputted push-pull signal S13 to generate corrected push-pull signal S18. The BPF 110 extracts a wobble frequency component from the corrected push-pull signal S18 to output band-pass filter output signal S22. After that, the binarizing unit 111 generates wobble binary signal S23 based on band-pass filter output signal S22.

Figure 2:
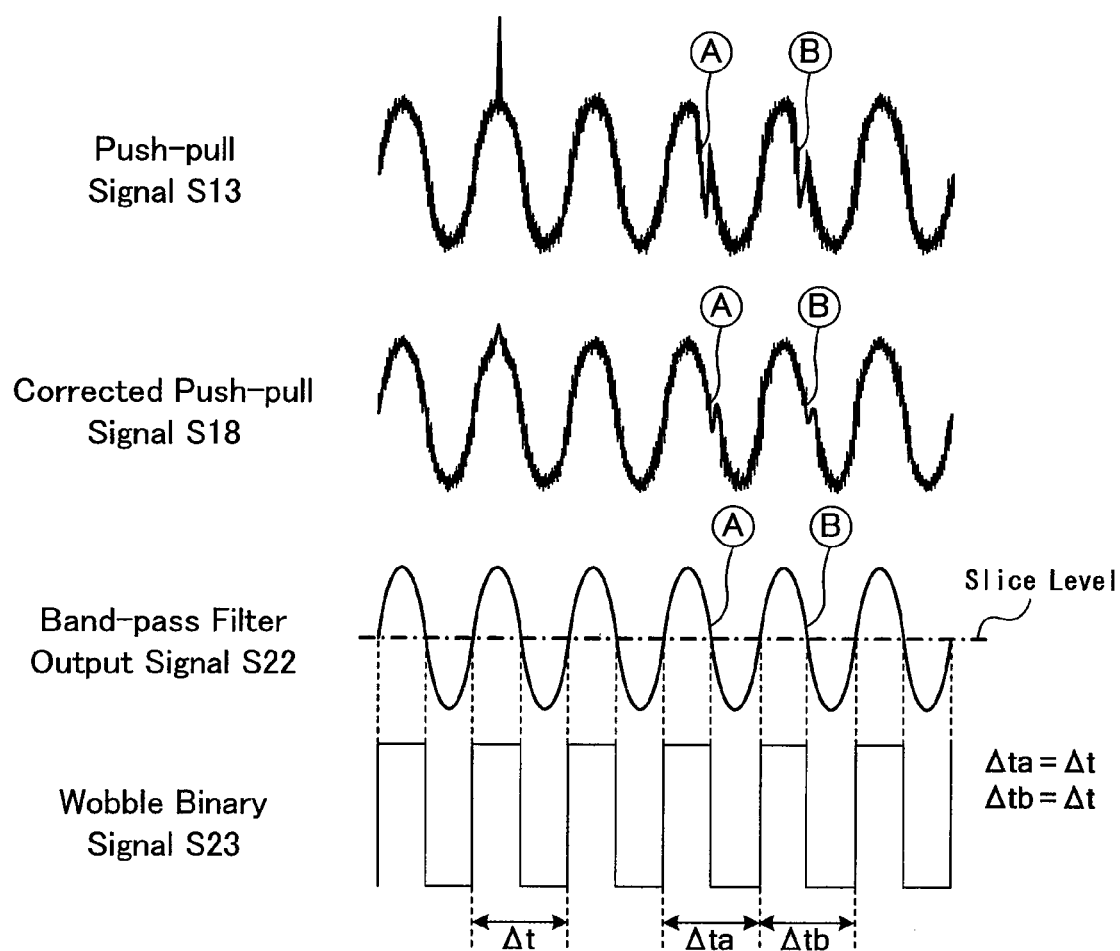
FIG. 2 is a waveform diagram of main signals in the wobble signal generating circuit 100 of the first embodiment.

In the wobble signal generating circuit 100 of this embodiment, push-pull signal S13, corrected push-pull signal S18, band-pass filter output signal S22, and wobble binary signal S23 have waveforms, for example, shown in FIG. 2.

Figure 3:
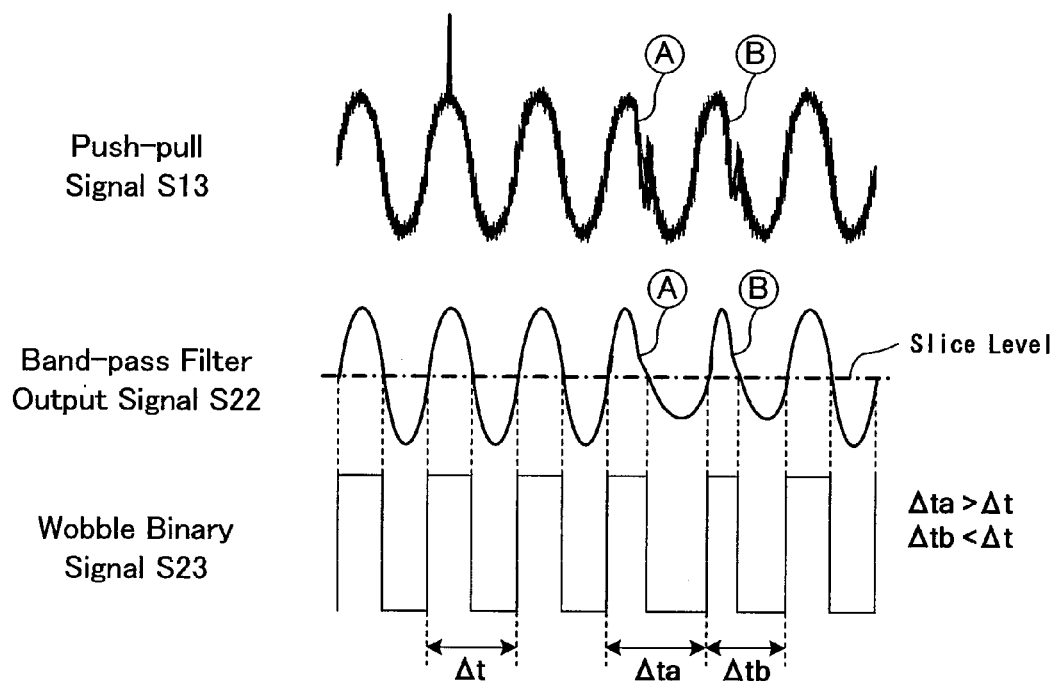
FIG. 3 is a waveform diagram of main signals in a case of push-pull signal S13 directly inputted to a BPF 110.

Should push-pull signal S13 be input directly to the BPF 110, push-pull signal S13, the output of the BPF 110, and wobble binary signal S23 which is generated based on the output by the BPF 110 would show the waveforms of FIG. 3. In this case, affected by, for example, pre-pits of an adjacent track, the waveform of push-pull signal S13 is distorted in A part and B part, resulting in distortion of the output of the BPF 110 in A part and B part. As a result, wobble binary signal S23 is distorted to have a cycle Δta longer than the proper wobble cycle Δt and a cycle Δtb shorter than the cycle Δt, resulting in exacerbating the jitters of wobble binary signal S23. Since the operation clock which is used as the reference for disc rotation control and recorded data is generated based on the wobble binary signal S23, the worsened jitters of wobble binary signal S23 cause deteriorations in recording quality and other characteristics.

In the information recording and reproducing system of this embodiment, however, the noise reduction unit 108 reduces an abrupt displacement of push-pull signal S13, and thus the distortion in push-pull signal S13 is unlikely to affect wobble binary signal S23 as shown in FIG. 2. Therefore, the information recording and reproducing system generates a precise reference clock signal based on wobble binary signal S23 and precisely records information on the DVD-R 102 using the precise reference clock signal.

Figure 4:
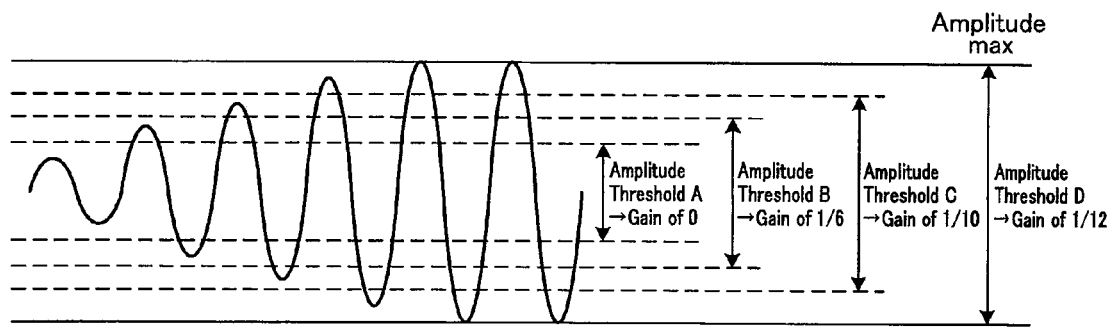
FIG. 4 is a diagram for illustrating a method to determine threshold signal S17 according to the amplitude level of push-pull signal S13 of the first embodiment.

In the description above, the gain value for calculating the displacement threshold is constant in the threshold calculation unit 107. That is, the displacement threshold to be calculated and the amplitude are proportional. Alternatively, as shown in FIG. 4, the threshold calculation unit 107 may select an appropriate gain value from among various gain values corresponding to some amplitude level ranges of push-pull signal S13. In the example of FIG. 4, the gain value is 0 when the amplitude of push-pull signal S13 is smaller than the amplitude threshold A; the gain value is 1/6 when the amplitude of push-pull signal S13 is equal to or greater than the amplitude threshold A and smaller than the amplitude threshold B; the gain value is 1/10 when the amplitude of push-pull signal S13 is equal to or greater than the amplitude threshold B and smaller than the amplitude threshold C; and the gain value is 1/12 when the amplitude of push-pull signal S13 is equal to or greater than the amplitude threshold C and smaller than amplitude threshold D.

Alternatively, the noise reduction unit 108 may use the level of threshold signal S17 corresponding to the minimum jitter of wobble binary signal S23 measured with varying threshold signal S17. The jitter of wobble binary signal S23 may be measured by a jitter measuring device externally connected to the information recording and reproducing system or by a jitter measuring unit provided in the information recording and reproducing system.

Similar to the gain value used by the threshold calculation unit 107, the displacement reduction gain value used by the displacement reduction unit 108b also may be determined according to the amplitude ranges of push-pull signal S13 or set to such a value that the jitter of wobble binary signal S23 is minimized.

Second Embodiment

Figure 5:
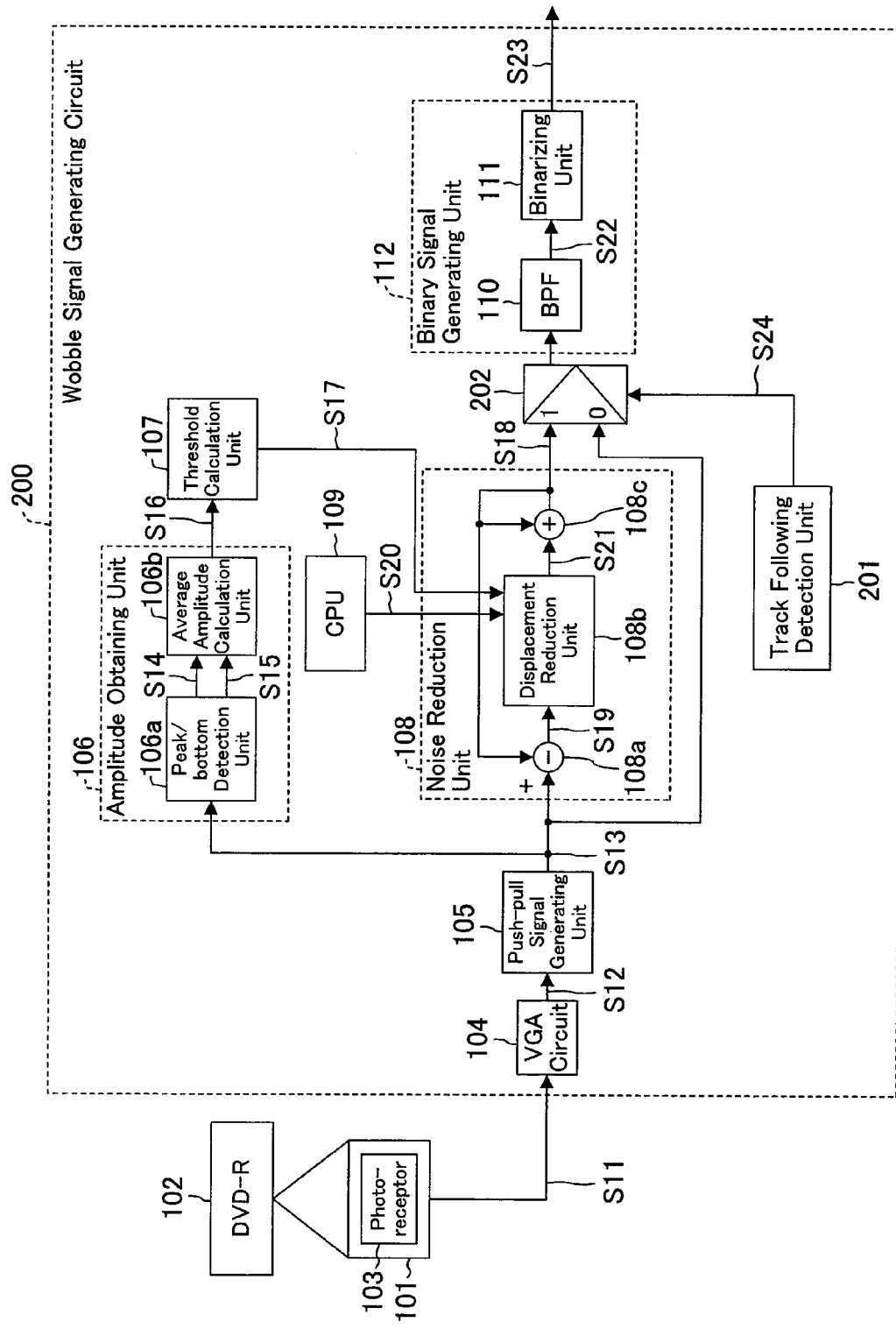
FIG. 5 is a block diagram illustrating a structure of a wobble signal generating circuit 200 of the second embodiment.

An information recording and reproducing system according to the second embodiment of the present invention includes a wobble signal generating circuit 200 instead of the wobble signal generating circuit 100 of the first embodiment, as shown in FIG. 5.

The wobble signal generating circuit 200 includes a track following detection unit 201 and a switching unit 202 in addition to the structure of the wobble signal generating circuit 100 of the first embodiment.

The track following detection unit 201 compares a tracking error signal to a predetermined threshold and determines that the information recording and reproducing system is in a track following mode when the tracking error signal is lower than the predetermined threshold and determines that the system is not in the track following mode when the tracking error signal is not less than the predetermined threshold. A track following mode is a mode in which a light beam is spotted on the track where the information is recorded. The track following detection unit 201, then, outputs track following signal S24 indicating whether the information recording and reproducing system is in the track following mode. Track following signal S24 is at an H (High) level when indicating that the information recording and reproducing system is in the track following mode and at an L (Low) level when indicating that the system is not in the track following mode.

When track following signal S24 outputted by the track following detection unit 201 is at the H level, the switching unit 202 outputs corrected push-pull signal S18 generated by the noise reduction unit 108 to the BPF 110. In contrast, when track following signal S24 is at the L level, the switching unit 202 outputs push-pull signal S13, to the BPF 110, outputted by the push-pull signal generating unit 105.

A method for detecting a tracking error is described, for example, in Japanese Laid-Open Patent Publication No. 2002-237064.

As described above, the wobble signal generating circuit 200 of this embodiment uses corrected push-pull signal S18 processed by the noise reduction unit 108 only in the track following mode, and switches the input signal to the BPF 110 into push-pull signal S13 based on track following signal S24 when the system is not in the track following mode. Noise components generated by the influence of, for example, pre-pits of an adjacent track are precisely reduced from push-pull signal S13 in stable tracking control, and wobble binary signal S23 is thus generated based on corrected push-pull signal S18 in which the noise components have been reduced.

Third Embodiment

Figure 6:
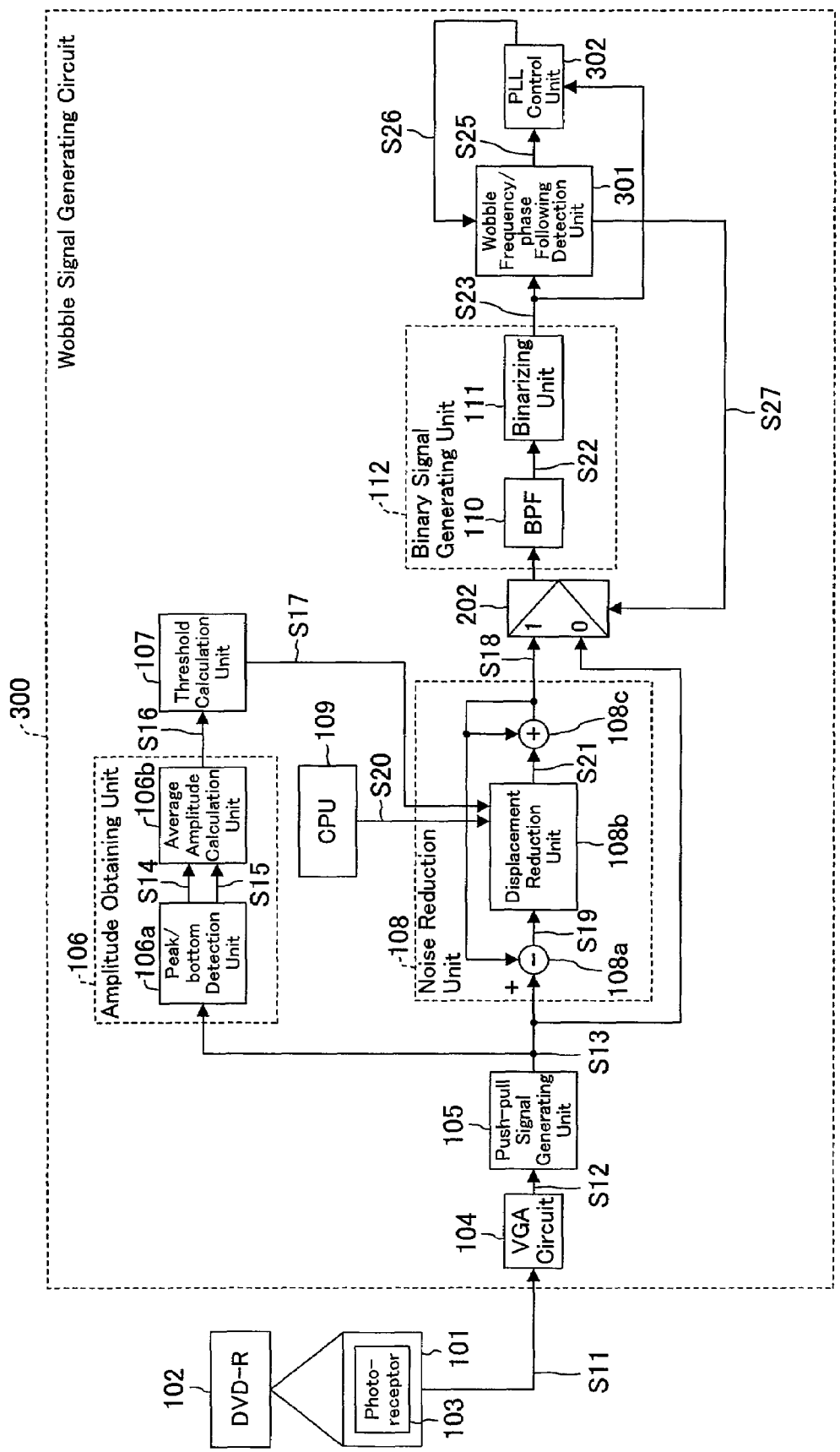
FIG. 6 is a block diagram illustrating a structure of a wobble signal generating circuit 300 of the third embodiment.

An information recording and reproducing system according to the third embodiment of the present invention includes a wobble signal generating circuit 300 instead of the wobble signal generating circuit 100 of the first embodiment, as shown in FIG. 6.

The wobble signal generating circuit 300 includes a switching unit 202, a wobble frequency/phase following detection unit 301, and a PLL control unit 302 in addition to the structure of the wobble signal generating circuit 100 of the first embodiment.

The wobble frequency/phase following detection unit 301 determines whether the information recording and reproducing system is in a wobble frequency/phase following mode based on the frequency difference and the phase difference between wobble clock signal S26 generated by the PLL control unit 302 (described later) and wobble binary signal S23 outputted by the binarizing unit 111. When both the frequency and phase differences are not less than respective predetermined values, the detection unit 301 determines that the information recording and reproducing system is not in a wobble frequency/phase following mode. When the frequency and/or phase difference is below the respective predetermined value, the detection unit 301 determines the system is in a wobble frequency/phase following mode. The detection unit 301 then outputs wobble following signal S27 indicating whether the information recording and reproducing system is in a wobble frequency/phase following mode. Wobble following signal S27 is at an H level when indicating that the information recording and reproducing system is in a wobble frequency/phase following mode, and at an L level when indicating that the system is not in a wobble frequency/phase following mode. A wobble frequency/phase following mode is defined as a mode in which a light beam follows a wobble on the DVD-R 102 and the difference between wobble binary signal S23 outputted by the binarizing unit 111 and wobble clock signal S26 generated by the PLL control unit 302 falls within a predetermined range. The wobble frequency/phase following detection unit 301 outputs PLL control signal S25 indicating a phase difference between wobble clock signal S26 and wobble binary signal S23. When the system is not in a track following mode, the information recording and reproducing system would never be in the wobble frequency/phase following mode.

The PLL control unit 302 includes a VCO (voltage-controlled oscillator) for generating wobble clock signal S26 using PLL control signal S25 outputted by the wobble frequency/phase following detection unit 301.

When wobble following signal S27 outputted by the wobble frequency/phase following detection unit 301 is at the H level, the switching unit 202 outputs corrected push-pull signal S18, which is generated by the noise reduction unit 108, to the BPF 110. In contrast, when wobble following signal S27 is at the L level, the switching unit 202 outputs push-pull signal S13, which is outputted by the push-pull signal generating unit 105, to the BPF 110.

The PLL circuit in this embodiment is composed of circuits included in the wobble frequency/phase following detection unit 301 and the PLL control unit 302, and a method for composing the PLL circuit is described in detail in, for example, Japanese Laid-Open Patent Publication No. 2005-310238.

In this operation, variation in disc rotation speed causes the frequency of the wobble signal component included in the push-pull signal to vary. The BPF 110 is, therefore, required to have a function of modifying the transit frequency according to the rotation speed. Such function is realized typically by a method in which the BPF 110 is composed of a digital circuit to define the operation clock as wobble clock signal S26, which is generated based on wobble binary signal S23.

Should any unit of the wobble signal generating circuit 300, the BPF 110 for example, be composed of a digital circuit using wobble clock signal S26 as the operation clock, an unsecured wobble cycle and wobble phase would increase the jitters of wobble clock signal S26 and thus operation in the unit would become unstable. Should the amplitude obtaining unit 106 be, for example, composed of a digital circuit using wobble clock signal S26 as the operation clock, the amplitude obtaining unit 106 would output average amplitude signal S16 containing errors, and thus the displacement reduction unit 108b unstably would operate in displacement value reduction. This might lead to an excessive reduction in the displacement value and distortion in the proper wobble signal component contained in corrected push-pull signal S18. In this case, since wobble clock signal S26 which is used as the operation clock for the amplitude obtaining unit 106 is generated based on the distorted wobble binary signal S23 generated by the corrected push-pull signal S18, the entire system may not be able to get out of the unstable operation due to such loop structure.

In the wobble signal generating circuit 300 structured according to this embodiment, corrected push-pull signal S18 processed by the noise reduction unit 108 is used only in a wobble frequency/phase following mode, which is a mode in which a wobble cycle and a wobble phase are ensured, and the wobble following signal S27 switches the input signal for the BPF 110 to push-pull signal S13 when the information recording and reproducing system is not in a wobble frequency/phase following mode. Since the wobble signal generating circuit 300 of this embodiment uses corrected push-pull signal S18 outputted by the noise reduction unit 108 as the input signal to the BPF 110 while a wobble cycle and a wobble phase are ensured, noise components are precisely reduced that are generated by the influence of pre-pits of adjacent tracks, for example, from push-pull signal S13 without making the system unstable.

Fourth Embodiment

Figure 7:
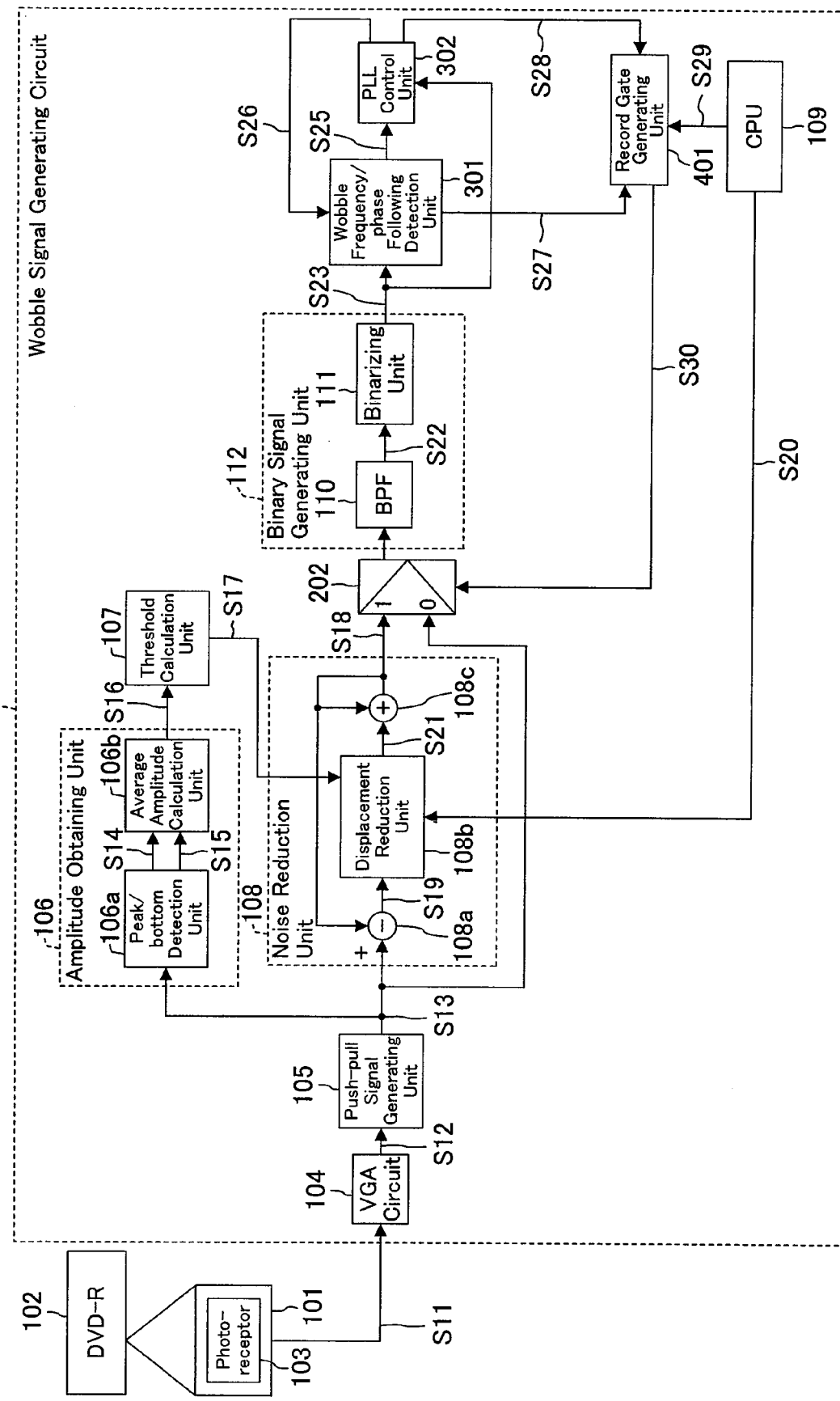
FIG. 7 is a block diagram illustrating a structure of a wobble signal generating circuit 400 of the fourth embodiment.

An information recording and reproducing system according to the fourth embodiment of the present invention includes a wobble signal generating circuit 400 instead of the wobble signal generating circuit 300 of the third embodiment, as shown in FIG. 7.

The wobble signal generating circuit 400 includes a record gate generating unit 401 in addition to the structure of the wobble signal generating circuit 300 of the third embodiment.

The record gate generating unit 401 detects a pre-pit, which is address information recorded on a disc, and identifies the position where the pre-pit was detected. The record gate generating unit 401 makes a count in synchronization with wobble multiplication clock signal S28 generated by the PLL control unit 302 with reference to the identified position, and then generates record gate signal S30 with reference to the count value. Specifically, when the count value reaches the value indicated by recording control signal S29, the record gate generating unit 401 raises record gate signal S30 to an H level. Recording control signal S29 is a signal indicating the address to turn on record gate signal S30 and is outputted by the CPU 109. Record gate signal S30 is at the H level for the section in which the information recording and reproducing system records information on the DVD-R 102, and is at an L level for the section in which the system does not record information on the DVD-R 102.

When record gate signal S30 is at the H level, which means the information recording and reproducing system is in the information recording mode, the switching unit 202 outputs corrected push-pull signal S18 generated by the noise reduction unit 108 to the BPF 110. In contrast, when record gate signal S30 is at the L level, which means the system is not in the information recording mode, the switching unit 202 outputs push-pull signal S13 outputted by the push-pull signal generating unit 105 to the BPF 110.

The wobble signal generating circuit 400 thus structured uses corrected push-pull signal S18 processed by the noise reduction unit 108 only in the information recording mode, and record gate signal S30 switches the input signal for the BPF 110 to push-pull signal S13 when the system is not in the information recording mode. The information recording and reproducing system of this embodiment precisely reduces noise components generated by the influence of, for example, pre-pits of adjacent tracks from push-pull signal S13 in the information recording mode where a wobble cycle is required that minimizes the influence of the jitters, while the system reproduces full information included in the original signal in normal reproduction.

Fifth Embodiment

Figure 8:
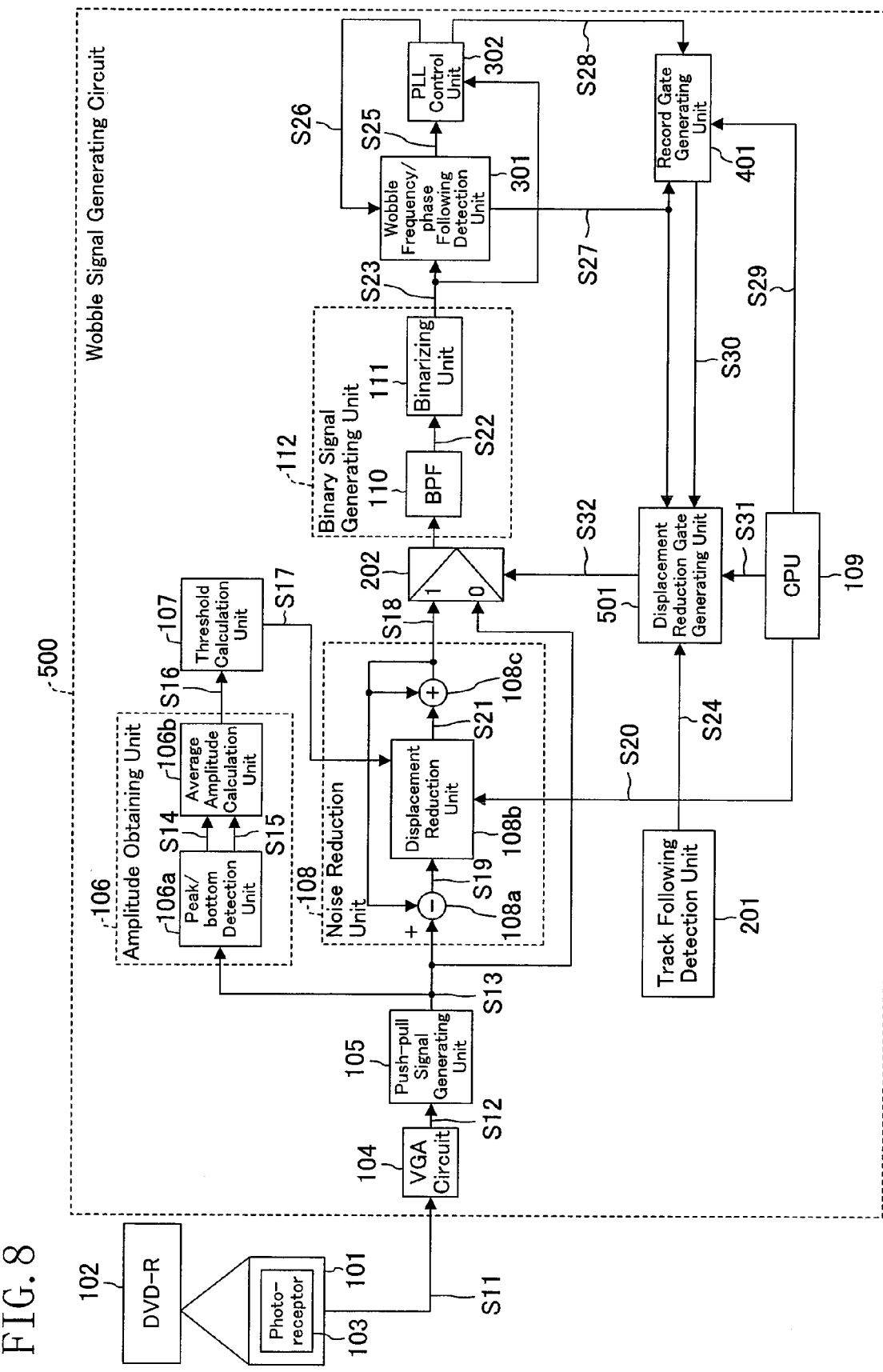
FIG. 8 is a block diagram illustrating a structure of a wobble signal generating circuit 500 of the fifth embodiment.

An information recording and reproducing system according to the fifth embodiment of the present invention includes a wobble signal generating circuit 500 instead of the wobble signal generating circuit 400 of the fourth embodiment, as shown in FIG. 8.

The wobble signal generating circuit 500 includes the track following detection unit 201 and a displacement reduction gate generating unit 501 in addition to the structure of the wobble signal generating circuit 400 of the fourth embodiment.

The displacement reduction gate generating unit 501 generates displacement reduction gate signal S32 based on track following signal S24, wobble following signal S27, record gate signal S30, and displacement reduction gate control signal S31.

Displacement reduction gate control signal S31 determines at least one of the following conditions for raising displacement reduction gate signal S32 to an H level: a condition in which the information recording and reproducing system is in the track following mode; a condition in which the system is in the wobble frequency/phase following mode; and a condition in which the system is in the information recording mode.

When displacement reduction gate control signal S31 indicates, for example, a value defining only that the information recording and reproducing system is in the track following mode as a condition for raising displacement reduction gate signal S32 to the H level, the operation same as the second embodiment is carried out. That is, the displacement reduction gate generating unit 501 outputs track following signal S24 as displacement reduction gate signal S32. When displacement reduction gate control signal S31 indicates a value defining only that the system is in the wobble following mode as the condition, the operation same as the third embodiment is carried out. That is, the displacement reduction gate generating unit 501 outputs wobble following signal S27 as displacement reduction gate signal S32. Similarly, when displacement reduction gate control signal S31 indicates a value defining only that record gate signal S30 is at the H level as the condition, the operation same as the fourth embodiment is carried out. That is, the displacement reduction gate generating unit 501 outputs record gate signal S30 as displacement reduction gate signal S32.

In the information recording and reproducing system of this embodiment, displacement reduction gate control signal S31 outputted by the CPU 109 controls whether the displacement reduction function offered by the noise reduction unit 108 is put into effect in each mode. According to the information recording and reproducing system of this embodiment, varying the value to be indicated by displacement reduction gate control signal S31 enables using the displacement reduction function offered by the noise reduction unit 108 in various states.

Sixth Embodiment

Figure 9:
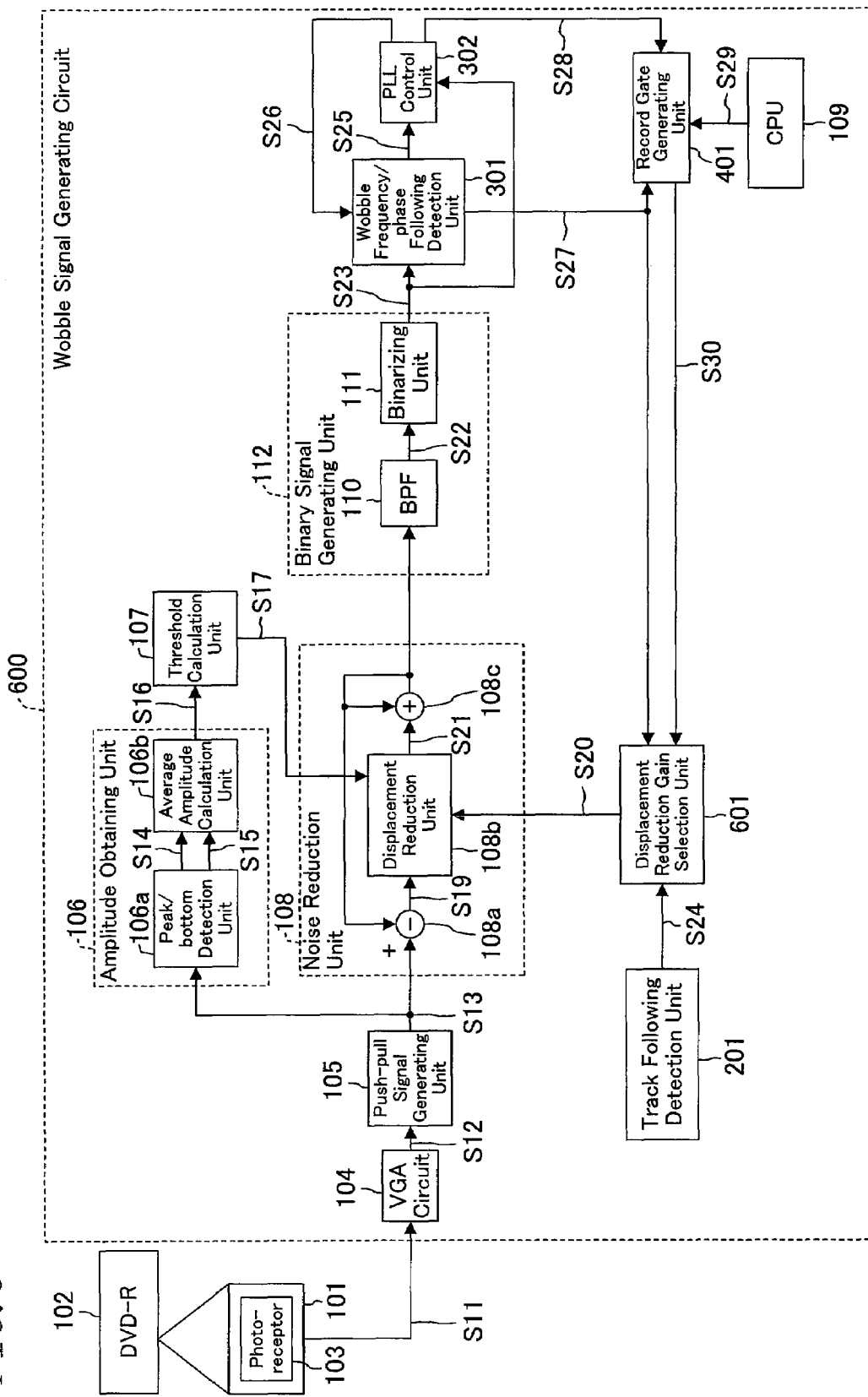
FIG. 9 is a block diagram illustrating a structure of a wobble signal generating circuit 600 of the sixth embodiment.

An information recording and reproducing system according to the sixth embodiment of the present invention includes a wobble signal generating circuit 600 instead of the wobble signal generating circuit 100 of the first embodiment, as shown in FIG. 9.

The wobble signal generating circuit 600 includes the track following detection unit 201, the wobble frequency/phase following detection unit 301, the PLL control unit 302, the record gate generating unit 401, and a displacement reduction gain selection unit 601 in addition to the structure of the wobble signal generating circuit 100 of the first embodiment.

The displacement reduction gain selection unit 601 outputs displacement reduction gain value signal S20 to be used for displacement value reduction by the displacement reduction unit 108b. The reduction gain value indicated by displacement reduction gain value S20 is switched according to the state of the information recording and reproducing system.

Specifically, the displacement reduction gain value for reducing displacement signal S19 is 1 in an initial state, switched to ½ when the system shifts from the initial state to the track following mode, switched to ¼ when shifting to the wobble frequency/phase following mode, and switched to ⅛ when shifting to the information recording mode.

Accordingly, the reduction gain value in the initial state is 1 in the noise reduction unit 108 of this embodiment, and thus information in the original signal remains. Since the displacement reduction gain is large in a track following mode, in which wobble cycles may not be constant, only the components widely fluctuated are moderated. In the wobble frequency/phase following mode, a displacement is moderated that falls within the extent not causing the PLL to be unlocked. In the recording mode, a corrected push-pull signal is obtained that has a wobble component as the main component because the displacement reduction gain value is defined to be small for greatly reducing a displacement that causes jitters.

Other Embodiment

Although the first through sixth embodiments are illustrated based on information recording and reproducing systems that record information on the DVD-R 102, the present invention is also applicable to systems for recording information on other types of optical discs having wobble, such as DVD-RW, DVD+R, DVD+RW, and DVD-RAM.

In the second through fifth embodiments, whether the switching unit 202 outputs corrected push-pull signal S18 or push-pull signal S13 is determined based on at least one of the following conditions: a condition in which the information recording and reproducing system is in the track following mode; a condition in which the system is in the wobble frequency/phase following mode; and a condition in which the system is in the information recording mode. It also may be determined based on whether another predetermined condition related to the state of the information recording and reproducing system is fulfilled.

In the sixth embodiment, the reduction gain value indicated by displacement reduction gain value signal S20 is switched based on the three modes of the information recording and reproducing system: whether the system is in the track following mode, the wobble frequency/phase following mode, and the information recording mode. It may be switched, however, based on one or two of the three modes of the system. It also may be switched based on other conditions related to the state of the information recording and reproducing system. In addition, a predetermined control signal may select a plurality of conditions for determining the reduction gain value.

In the first through sixth embodiments, the noise reduction unit 108 reduces the displacement value to a product of the displacement value and the displacement reduction gain value. The reduction is not limited as such, and the noise reduction unit 108 may reduce the displacement value by a predetermined absolute magnitude.

In the first through sixth embodiments, the noise reduction unit 108 reduces the difference between push-pull signal S13 of the current sampling cycle and corrected push-pull signal S18 of the immediately preceding sampling cycle. It also may reduce the difference between push-pull signal S13 of the current sampling cycle and push-pull signal S13 of a predetermined period earlier.

As described above, the information recording system and the information recording method according to the present invention have the effect of precisely recording information on an optical disc, and they are useful for a technique, for example, to precisely generate a reference clock signal for precisely identifying a recording position when recording information on a wobbled optical disc, such as a DVD-R.

What is claimed is:

1. An information recording system for recording information on an optical disc using a reference clock signal generated based on a push-pull signal including a wobble frequency component, the system comprising:
    an amplitude obtaining unit for obtaining an amplitude value of the push-pull signal;
    a threshold calculation unit for calculating a displacement threshold of the push-pull signal based on the amplitude value obtained by the amplitude obtaining emit; and
    a noise reduction unit for generating a corrected push-pull signal by correcting the push-pull signal such that a displacement exceeding the displacement threshold is reduced,
    wherein the reference clock signal is generated based on the corrected push-pull signal generated by the noise reduction unit.

2. The information recording system according to claim 1, wherein the amplitude obtaining unit detects a peak value and a bottom value of the push-pull signal in a predetermined wobble cycle and obtains the amplitude value based on the detected peak and bottom values.

3. The information recording system according to claim 1, wherein
    the threshold calculation unit calculates the displacement threshold by multiplying the amplitude value from the amplitude obtaining unit by a gain value such that the amplitude value is reduced, and
    the threshold calculation unit outputs the displacement threshold at a constant level before the amplitude obtaining unit obtains the amplitude value.

4. The information recording system according to claim 1, wherein when the system is in a predetermined state, the reference clock signal is generated based on the corrected push-pull signal generated by the noise reduction unit.

5. The information recording system according to claim 4, wherein the predetermined state is a track following mode.

6. The information recording system according to claim 4, further comprising a binary signal generating unit for generating a wobble binary signal based on the push-pull signal,
    wherein the predetermined state is a mode in which a cycle of a reference clock generated with reference to the wobble binary signal generated by the binary signal generating unit follows a wobble on the optical disc.

7. The information recording system according to claim 4, wherein the predetermined state is a mode of recording information on the optical disc.

8. The information recording system according to claim 4, further comprising a binary signal generating unit for generating a wobble binary signal based on the push-pull signal,
    wherein the predetermined state fulfills at least one of the following conditions determined by a displacement reduction gate control signal: a condition in which the system is in a track following mode; a condition in which a cycle of a reference clock generated with reference to the wobble binary signal generated by the binary signal generating unit is in a mode of following a wobble on the optical disc; and a condition in which the system is in a mode of recording information on the optical disc.

9. The information recording system according to claim 1,
    wherein the noise reduction unit reduces a displacement exceeding the displacement threshold calculated by the threshold calculation unit to a displacement multiplied by a displacement reduction gain value, and
    wherein the system further comprises a displacement reduction gain selection unit for switching the displacement reduction gain value according to a state of the system.

10. The information recording system according to claim 9, further comprising a binary signal generating unit for generating a wobble binary signal based on the push-pull signal,
    wherein the displacement reduction gain selection unit switches the displacement reduction gain value according to at least one of the following conditions: whether the system is in a track following mode; whether the wobble binary signal generated by the binary signal generating unit is in a mode of following a wobble on the optical disc; and whether the system is in a mode of recording information on the optical disc.

11. An information recording method for recording information on an optical disc using a reference clock signal generated based on a push-pull signal including a wobble frequency component, the method comprising:
    an amplitude obtaining step of obtaining an amplitude value of the push-pull signal;
    a threshold calculation step of calculating a displacement threshold of the push-pull signal based on an amplitude value obtained in the amplitude obtaining step; and
    a noise reduction step of generating a corrected push-pull signal by correcting the push-pull signal such that a displacement exceeding the displacement threshold is reduced,
    wherein the reference clock signal is generated based on the corrected push-pull signal generated in the noise reduction step.

* * * * *